United States Patent [19]

Oliver

[11] Patent Number: 4,915,274

[45] Date of Patent: Apr. 10, 1990

[54] SPARE WHEEL MOUNTING BRACKET

[76] Inventor: Lee G. Oliver, 1919 W. 10th Pl., Gary, Ind. 46404

[21] Appl. No.: 185,913

[22] Filed: Apr. 25, 1988

[51] Int. Cl.⁴ .............................................. B62D 43/02
[52] U.S. Cl. ............................... 224/42.24; 224/42.25; 414/463
[58] Field of Search .............. 224/42.03, 42.06, 42.08, 224/42.07, 42.21, 42.23, 42.24, 42.29, 42.25, 42.13; 211/23; 248/552, 309.2, 371; 280/495, 511; 414/428, 463, 465, 466, 467

[56] References Cited

U.S. PATENT DOCUMENTS

| | | | |
|---|---|---|---|
| 1,519,751 | 12/1924 | Baker | 224/42.24 |
| 1,830,100 | 11/1931 | Elliott | 224/42.24 |
| 2,805,807 | 9/1957 | Slack | 224/42.21 |
| 3,804,308 | 4/1974 | Bodde | 224/42.21 |
| 3,977,713 | 8/1976 | Guin | 224/42.29 |
| 4,089,449 | 5/1978 | Bayne et al. | 224/42.24 |

FOREIGN PATENT DOCUMENTS 7336042  6/1975  France .............................. 224/42.24

Primary Examiner—Henry J. Recla
Assistant Examiner—Glenn T. Barrett
Attorney, Agent, or Firm—Baker & Daniels

[57] ABSTRACT

Mounting bracket for a spare wheel that has a hub hole and at least two bolt holes. The bracket includes a shaft support structure, a first shaft affixed to the shaft support structure, capable of receiving the hub hole of the wheel, and at least two second shafts affixed to the shaft support structure, capable of receiving the bolt holes of the wheel. The second shafts have nuts placed on them. The placement of the nuts may be adjusted to control the tile of the wheel with respect to the shaft support structure. The invention further includes vertical support members downwardly extending from the shaft support structure for connecting the shaft support structure to the underside of the vehicle.

7 Claims, 2 Drawing Sheets

SPARE WHEEL MOUNTING BRACKET

FIELD OF THE INVENTION

This invention relates to devices for mounting spare wheels on motor vehicles.

BACKGROUND OF THE INVENTION

Many devices are known in the art for mounting spare wheels on motor vehicles. Most prior devices provide for mounting brackets that support the spare wheel. In the past, such brackets have been attached to the rear of the vehicle, such as on the trunk lid, rear doors, rear quarter panels or rear bumpers. Such devices have the uniform disadvantage of requiring that holes be drilled in the body of the vehicle to attach the brackets, thus permanently detracting from the aesthetic appearance of the vehicle, even if the device is subsequently removed. In addition, most such brackets may not be adapted for use with different vehicles having varying rear portion designs. Specifically, prior mounting assemblies do not provide a method for adjusting the vertical tilt of the mounted wheel.

OBJECTS OF THE INVENTION

One object of the invention is to provide a wheel mounting bracket which does not require holes in the visible portion of the vehicle body to attach the bracket to the vehicle.

Another object of the invention is to provide a wheel mounting bracket that allows the vertical tilt of the wheel to be adjusted.

Another object of the invention is to provide a wheel mounting bracket that may be easily removed from the vehicle.

Another object of the invention is to provide a wheel mounting bracket that allows the wheel to be locked to the bracket.

Still other objects and advantages of the invention will become apparent to those of skill in the art after reading the following description of a preferred embodiment.

SUMMARY OF THE INVENTION

The invention is a mounting bracket for a spare wheel that has a hub hole and at least two bolt holes. The bracket includes a shaft support structure, a first shaft affixed to said shaft support structure, capable of receiving the hub hole of the wheel, and at least two second shafts affixed to said shaft support structure, capable of receiving the bolt holes of the wheel. The second shafts include means for controlling the tilt of said wheel with respect to the shaft support structure. The invention further includes means downwardly extending from said shaft support structure for connecting said shaft support structure to the underside of the vehicle.

DETAILED DESCRIPTION OF THE PRESENT INVENTION

Figure 1:
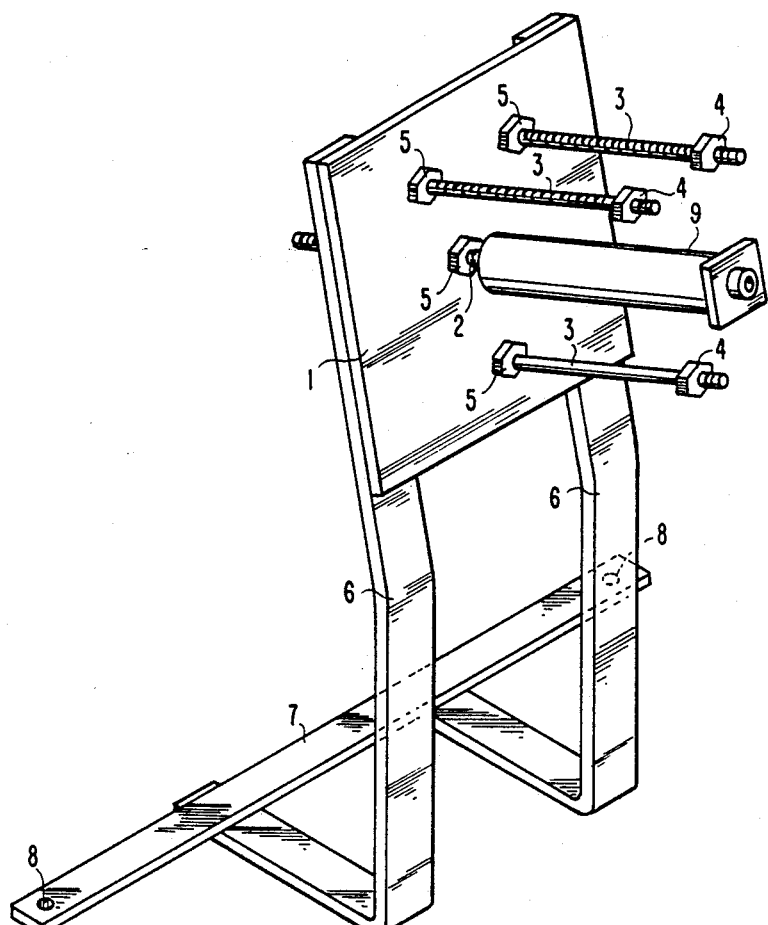
FIG. 1 is a perspective view of the device of the invention.

FIG. 1 is a perspective view of the device of the invention. The invention comprises a bracket for attachment to a vehicle. Shaft support structure 1 supports first threaded shaft 2 and three second threaded shafts 3. Automobile wheels typically include a center hole, or hub hole. This hole may be received by first shaft 2. In addition, automobile wheels typically include either four or five bolt holes for mounting the wheel onto the vehicle. Second shafts 3 may receive these bolt holes. Although there are three second shafts 3 in the preferred embodiment, the invention contemplates that the number of second shafts 3 may be anywhere from two to the number of bolt holes of the wheel to be mounted.

The first shaft 2 and the second shafts 3 are all secured to shaft support structure 1 by nuts 5 on opposing sides of shaft support structure 1.

An important feature of the invention is the ability of the device to control the tilt of the wheel. It is desirable to control this angle of tilt so that a mounted wheel does not interfere with the other structures of the vehicle, such as the trunk lid. In addition, it is desirable to mount a wheel so that it is generally parallel with the counter of the body of the vehicle to enhance the overall aesthetic appearance of the combination. In the preferred embodiment, the tilt is controlled by adjusting the placement of the nuts 4 on second shafts 3. Nuts 4 should be of a diameter such that they may not be passed through the bolt holes of the wheel.

The device of the invention also includes a structure that downwardly extends from said shaft support structure 1 for connecting said shaft support structure to the underside of the vehicle. This structure includes vertical support members 6 which are welded to the opposite sides of shaft support plate 1. Vertical support members are also designed to extend underneath the vehicle for attachment to the underside of the vehicle. Such attachment is provided by cross member 7 which is welded to vertical support members 6. Cross member 7 includes bolt holes 8 which provide for attachment to the chassis of the vehicle.

In the preferred embodiment, a wheel lock 9 is placed on first shaft 2 to help prevent theft of a wheel placed on the device.

Figure 2:
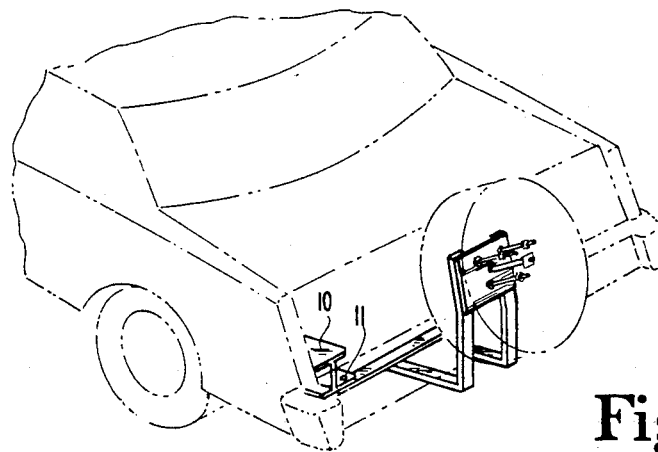
FIG. 2 is a perspective showing how the device of the invention may be attached to the undeside of a vehicle.

FIG. 2 is a perspective showing how the device of the invention may be attached to the underside of a vehicle. Most vehicles include a chassis to which the device may be attached in a manner similar to that provided for attachment of a trailer hitch. In the preferred embodiment, the device is attached to the beams 10 of a 1985 Cadillac Sedan De Ville by bolt 11. FIG. 2 also shows in outline the location of placement of a wheel on the device of the invention.

Figure 3:
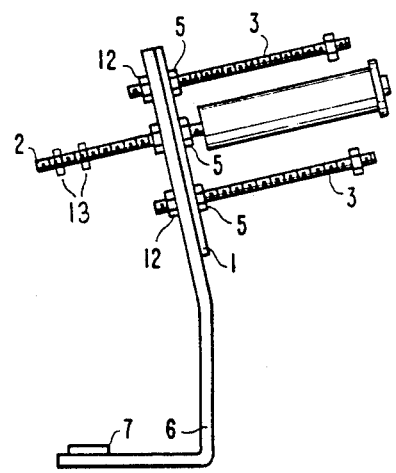
FIG. 3 is a side view of the device of the invention.

FIG. 3 is a side view of the device of the invention. To provide further support of the device, shaft 2 may be extend through shaft support structure 1. In the 1985 Cadillac Sedan De Ville with which the preferred embodiment is employed, the license plate may be removed, exposing the license plate light. This light may also be removed, along with its associated wires, to expose a pre-existing ½ inch hole in the rear body of the vehicle through which first shaft 2 may be extended. Nuts may be placed on opposing sides of said hole to provide the additional support referred to above. In order to comply with state law, the user of the invention should be sure to display the removed license plate elsewhere on the vehicle.

FIG. 3 also shows nuts 12 which may be used to secure second shafts 3 to shaft support structure 1.

Figure 4:
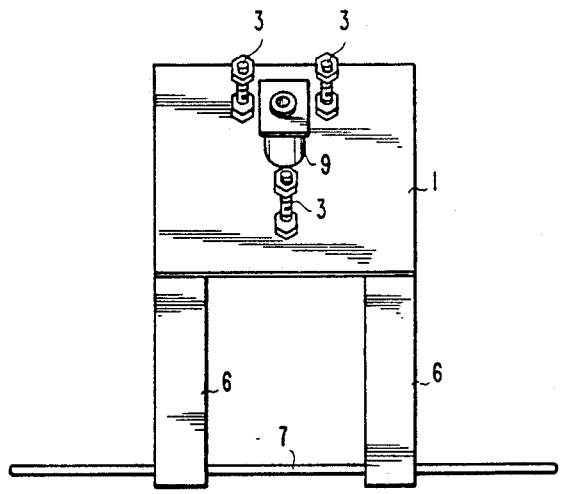
FIG. 4 is a front view of the device of the invention.

FIG. 4 is a front view of the device of the invention. From this view the attractive construction of the device may be appreciated, even when there is no wheel on the device.

Figure 5:
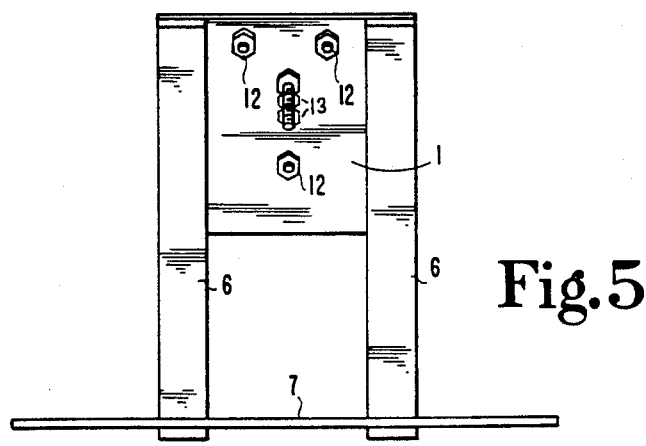
FIG. 5 is a rear view of the device of the invention.

FIG. 5 is a rear view of the device of the invention. From this view, the elegant simplicity of the device may be more fully appreciated. Overall, the invention provides a method for mounting a wheel on a vehicle that does not require drilling holes in the body of the vehicle, which may be easily detached, and which may be constructed with a minimum number of parts at a low cost.

Many changes could be made in the above construction and many apparently widely different embodiments of this invention could be made without departing from the scope thereof, and it is intended that all matter contained in the above description or shown in the accompanying drawings shall be interpreted as illustrative and not in a limiting sense.

I claim:

1. A mounting bracket for a spare wheel adapted to be attached to a vehicle having an underside and a chassis, said wheel having a hub hole and at least two bolt holes, said bracket comprising:

a shaft support structure having a first side and a second side;

a first shaft affixed to said shaft support structure and having a first portion extending from said first side, wherein said first portion is capable of receiving the hub hole of the wheel;

at least two second shafts affixed to said shaft support structure and extending from said first side, wherein said second shafts are capable of receiving the bolt holes of the wheel;

means located on said second shafts for controlling the tilt of said wheel with respect to the support structure;

means downwardly extending from said shaft support structure for connecting said shaft support structure to the underside of the vehicle;

means for attaching said shaft support structure to a preexisting hole of said vehicle, said means comprising a second portion of said first shaft extending from said second side of said shaft support structure through the preexisting hole located on said vehicle and nuts located on said second portion for securing said first shaft to said vehicle.

2. The mounting bracket of claim 1, further comprising means located on said first shaft for locking the wheel to said mounting bracket.

3. The mounting bracket of claim 1, wherein: the means located on said second shafts for controlling the tilt of said wheel comprise nuts.

4. The mounting bracket of claim 1, in which the means downwardly extending from said shaft support structure may be attached to the chassis of the vehicle.

5. The mounting bracket of claim 1 in which the means downwardly extending from said shaft support structure comprise:

two vertical support members attached to said second side of said shaft support structure, said vertical support members extend underneath the vehicle.

6. The mounting bracket of claim 5, further comprising a horizontal cross member attached to said vertical support members, said cross member is adapted to be attached to the chassis of the vehicle.

7. A mounting bracket of claim 1 having three second shafts.

* * * * *